US012637885B2

United States Patent
(12) United States Patent
Jiang et al.

(10) Patent No.: US 12,637,885 B2
(45) Date of Patent: May 26, 2026

(54) INTEGRATED DOOR ASSEMBLY OF A PREFAB MODULAR SHED

(71) Applicant: YIXIANG BLOW MOLDING FURNITURE CO., LTD., Yuyao (CN)

(72) Inventors: Yixiang Jiang, Yuyao (CN); Jinglei Jiang, Yuyao (CN); Shangxi Jiang, Yuyao (CN)

(73) Assignee: YIXIANG BLOW MOLDING FURNITURE CO., LTD., Yuyao (CN)

( * ) Notice: Subject to any disclaimer, the term of this patent is extended or adjusted under 35 U.S.C. 154(b) by 132 days.

(21) Appl. No.: 18/912,503

(22) Filed: Oct. 10, 2024

(65) Prior Publication Data

US 2025/0333988 A1 Oct. 30, 2025

(30) Foreign Application Priority Data

Apr. 25, 2024 (CN) ......................... 202420876087.8

(51) Int. Cl.

| | |
|---|---|
| ***E05D 3/02*** | (2006.01) |
| ***E04H 1/12*** | (2006.01) |
| ***E05D 5/06*** | (2006.01) |
| ***E06B 3/36*** | (2006.01) |
| ***E06B 3/86*** | (2006.01) |

(52) U.S. Cl.

CPC ............ *E05D 3/02* (2013.01); *E04H 1/1205* (2013.01); *E05D 5/06* (2013.01); *E06B 3/86* (2013.01); *E06B 3/36* (2013.01)

(58) Field of Classification Search

CPC ........... E05D 3/02; E05D 5/06; E04H 1/1205; E06B 3/86; E06B 3/36

See application file for complete search history.

(56) References Cited

U.S. PATENT DOCUMENTS

| | | | | | |
|---|---|---|---|---|---|
| 3,731,449 | A * | 5/1973 | Kephart, Jr. | B32B 27/065 | 52/309.7 |
| 5,357,728 | A * | 10/1994 | Duncanson | E04C 2/526 | 52/592.4 |
| 7,377,077 | B2 * | 5/2008 | Rebeck | E04H 1/1205 | 52/DIG. 14 |
| 7,685,676 | B2 * | 3/2010 | Mc Clellan | E05D 1/02 | 16/221 |
| 7,770,334 | B2 * | 8/2010 | Mower | E04H 1/1205 | 52/79.6 |
| 7,770,337 | B2 * | 8/2010 | Mower | E04H 1/1205 | 52/79.5 |
| 7,797,885 | B2 * | 9/2010 | Mower | E04H 1/1205 | 52/270 |

(Continued)

*Primary Examiner* — Rodney Mintz

(74) *Attorney, Agent, or Firm* — Platinum Intellectual Property PC

(57) ABSTRACT

The present subject matter discloses an integrated door assembly for a prefabricated shed constructed from modular plastic components or panels. The door assembly comprises a door panel that includes a door side panel and a door body, which are integrally formed through blow molding. The door body is connected to the door side panel via an embedded folding groove, featuring a thinner plastic material at the fold to allow for flexibility and ease of movement. Additionally, the door assembly incorporates a pivotable frame bracket that encases the edges of the hinged, rotating panels, enhancing both strength and durability.

16 Claims, 6 Drawing Sheets

(56) References Cited

U.S. PATENT DOCUMENTS 7,926,227 B2 * 4/2011 Mower ............... E04B 1/34321 52/270
8,051,617 B2 * 11/2011 Mower ..................... E06B 5/02 52/311.1
8,707,631 B2 * 4/2014 Scouten .................... E04H 9/14 52/68
10,422,169 B2 * 9/2019 Christenson .............. E05D 1/02
10,697,171 B2 * 6/2020 Melo Pereira .......... E04C 2/384
11,020,681 B2 * 6/2021 Rieber .................... F16C 11/04
11,135,525 B2 * 10/2021 Rieber .................. E04B 1/3445
11,274,431 B2 * 3/2022 McCall ............... E04F 13/0871
11,846,130 B2 * 12/2023 Jiang ......................... E05D 1/02
11,927,008 B2 * 3/2024 Giacomini .............. E04B 1/345
12,116,773 B2 * 10/2024 Keller ....................... E04C 2/46
12,291,859 B2 * 5/2025 Keller ....................... E04B 5/02
12,480,303 B2 * 11/2025 Jiang ................... E04B 1/34317
12,486,659 B2 * 12/2025 Jiang ................... E04B 1/34317
12,560,011 B2 * 2/2026 Jiang ......................... E05D 1/02
12,584,313 B2 * 3/2026 Weng ........................ E04C 2/40
2003/0005660 A1 * 1/2003 Stibolt .................... E04F 13/06 52/582.1
2005/0126083 A1 * 6/2005 Rebeck ................. E04H 1/1205 52/79.1
2005/0210760 A1 * 9/2005 Mower ..................... E06B 5/02 52/64
2005/0223652 A1 * 10/2005 Mower ............... E04B 1/34321 52/79.1
2005/0223653 A1 * 10/2005 Mower ................. E04H 1/1205 52/79.1
2005/0223655 A1 * 10/2005 Mower ................. E04H 1/1205 52/79.5
2007/0199176 A1 * 8/2007 Mc Clellan ............... E05D 1/02 16/224
2007/0267155 A1 * 11/2007 Howe ..................... E06B 3/481 160/232
2008/0216426 A1 * 9/2008 Bunker ............... E04B 1/34315 52/285.3
2011/0011010 A1 * 1/2011 Mower ..................... E04B 7/20 52/79.5
2012/0180404 A1 * 7/2012 Scouten .................. E04H 9/028 52/79.5
2015/0067983 A1 * 3/2015 Carey ................ B29C 48/0017 16/225
2016/0138258 A1 * 5/2016 Schaffert ............... E04B 1/3445 52/79.5
2017/0051497 A1 * 2/2017 Kolbe .................. E04H 1/1205
2018/0283065 A1 * 10/2018 Christenson .............. B32B 5/24
2019/0055728 A1 * 2/2019 Melo Pereira ............ E04C 2/22
2019/0136506 A1 * 5/2019 McCall ................... E04C 2/365
2020/0049462 A1 * 2/2020 Jones .................... E04H 1/1205
2020/0215448 A1 * 7/2020 Rieber ................. A63H 33/008
2020/0215449 A1 * 7/2020 Rieber .................... E04B 1/345
2022/0127840 A1 * 4/2022 Giacomini .......... E04B 1/34384
2022/0298783 A1 * 9/2022 Shi ........................ E04B 1/3445
2023/0061113 A1 * 3/2023 Keller ....................... E04B 2/56
2023/0068992 A1 * 3/2023 Streeter ................... E04H 1/005
2023/0120248 A1 * 4/2023 Jiang ......................... E05D 1/02 16/254
2023/0167636 A1 * 6/2023 Keller ....................... E04B 1/14 52/91.3
2024/0035271 A1 * 2/2024 Jiang ................... E04B 1/34317
2024/0035272 A1 * 2/2024 Jiang ................... E04B 1/34317
2024/0068285 A1 * 2/2024 Jiang ......................... E05D 1/02
2025/0027314 A1 * 1/2025 lin ......................... E04H 1/1205
2025/0034891 A1 * 1/2025 Jiang ..................... E04H 1/1205
2025/0163695 A1 * 5/2025 Rais-Rohani ......... E04B 1/3445
2025/0188740 A1 * 6/2025 Weng ........................ E04C 2/40
2025/0333951 A1 * 10/2025 Jiang ..................... E04H 1/1205
2025/0333960 A1 * 10/2025 Jiang ..................... E04H 1/1205
2026/0055596 A1 * 2/2026 Jiang ................... E04B 1/34317
2026/0055597 A1 * 2/2026 Jiang ................... E04B 1/34317
2026/0062973 A1 * 3/2026 Procton ................... E05D 15/48

* cited by examiner

INTEGRATED DOOR ASSEMBLY OF A PREFAB MODULAR SHED

CROSS-REFERENCES TO RELATED APPLICATIONS

This application claims priority to Chinese Patent Application No. 202420876087.8, entitled "Door Structure of a Modular Shed," filed Apr. 25, 2024, which is incorporated herein by reference for all purposes.

TECHNICAL FIELD

The present subject matter is in the field of plastic assembly. More particularly, embodiments of the present subject matter relate to a storage shed comprising modular molded plastic panels.

BACKGROUND

Molded plastic has a wide variety of benefits as a furniture material and component. For example, it is highly resistant to impact, moisture, and chemicals, which makes it more durable compared to other materials like wood or glass; it is also lighter than many other materials, rendering it advantageous for transportation cost. Furthermore, molded plastics can be shaped into virtually any form, allowing for a great deal of design flexibility. This allows for more creative and complex designs than other materials. An example of such a design is a prefab modular shed that is economical to manufacture, easy to transport and install while providing many novel and beneficial design features.

The shed's door is an important component for the structure's overall structural stability due to its frequent usage. In conventional plastic sheds, plastic doors are installed on the door frame using hinges, which not only increases costs but also makes installation more difficult. Additionally, particularly in larger sheds, the heavy door panels, over time, can cause sag and result in misalignment of the door, leading to failures of the door's function. Furthermore, since plastic sheds are usually placed outdoors, rainwater could seep into the shed via the conventional hinged door panels. In summary, there is a need for further improvement in the door structures of plastic modular sheds.

SUMMARY OF THE INVENTION

The present subject matter is directed to improved designs for a door assembly that is easy to install and durable over time using prefabbed plastic components or panels. Embodiments of the present subject matter are discussed below with reference to FIGS. 1-6.

In the following description, for purposes of explanation, numerous specific details are set forth in order to provide a thorough understanding of the present subject matter. It will be apparent, however, to one skilled in the art that the present subject matter may be practiced without some of these specific details. In addition, the following description provides examples, and the accompanying drawings show various examples for the purposes of illustration. Moreover, these examples should not be construed in a limiting sense as they are merely intended to provide examples of embodiments of the subject matter rather than to provide an exhaustive list of all possible implementations. In other instances, well-known structures and devices are shown in block diagram form in order to avoid obscuring the details of the disclosed features of various described embodiments.

The present subject matter is an integrated door assembly for a prefabricated shed constructed from modular plastic components or panels. The door assembly comprises a door panel that includes a door side panel and a door body, which are integrally formed through blow molding. The door body is connected to the door side panel via an embedded folding groove, featuring a thinner plastic material at the fold to allow for flexibility and ease of movement. Additionally, the door assembly incorporates a pivotable frame bracket that encases the edges of the hinged, rotating panels, enhancing both strength and durability.

According to some embodiments, the door assembly of the present subject matter can include one door panel comprising a door side panel and a door body, which are integrally formed by blow molding. The door body can be connected to the door side panel through an embedded folding groove that is integrally formed with both the door side panel and the door body, allowing the door body to rotate relative to the door side panel. The embedded folding groove can have thinner plastic material than remaining of the panel. This design can eliminate the need for conventional hinge structures, as the door body and side panel can be connected using flexible blow-molded materials. This also enables the door body and side panel to be formed together in one blow-molding process and using a single mold, thus improving the manufacture efficiency. Furthermore, the seamless folding groove can eliminate the need of hinges and opening between two panels, thus preventing water to enter the modular shed structure.

To prevent the door panel from sagging due to repeated usages, and to avoid twisting caused by asynchronous movements, a pivotable frame bracket can encase the edge of the joint rotating panels to increase its strength and durability. Specifically, the bottom of the door side panel adjacent to the door body can be equipped with a first support member, and the bottom of the door body adjacent to the door side panel can have a second support member, wherein the first support member and the second support member are hinged to form the pivotable frame bracket, with the embedded groove positioned below them.

Additionally, the top of the door side panel adjacent to the door body can have a third support member, and the top of the door body adjacent to the door side panel can have a fourth support member. These support members can be rotationally connected to form another pivotable frame bracket, with the embedded groove positioned below the rotational connection of the third and fourth support members.

To secure the supporting members to the door side panels and the door body, the first, second, third, and fourth support members can form U-shaped slots, within which the door side panels and door body can be positioned. The U-shaped slots can have through-holes on their opposite sidewalls, and corresponding mounting holes can be provided at the respective positions of the door side panels and door body. Connectors or fasteners can pass through these mounting holes and through-holes to secure the respective support members to the door side panels and the door body.

According to some embodiments, the present subject matter is directed to a door assembly of a blow-molded modular shed that comprises a pair of door panels, each door panel comprising a door side panel connected to a door body via an embedded folding groove, wherein the embedded folding groove has thinner plastic material than the rest of the door panel, and wherein the embedded folding groove enables the door body to rotate in relation to the door side panel, and a plurality of metal pivotable frame brackets, each metal pivotable frame bracket encasing an edge of the door side panel and the door body near the embedded folding groove.

According to some embodiments, the present subject matter is directed to a door assembly of a blow-molded modular shed that comprises a pair of door panels, each door panel comprising a door side panel connected to a door body via an embedded folding groove, wherein the embedded folding groove enables the door body to rotate in relation to the door side panel, and a plurality of pivotable frame brackets, each metal pivotable frame bracket encasing an edge of the door side panel and the door body near the embedded folding groove.

According to some embodiments, the present subject matter is directed to a modular shed structure made of molded plastic panels that comprises a floor comprising a plurality of floor panels, a plurality of wall panels coupled with the plurality of floor panels, a roof that comprises a central roof panel that is foldable via a second embedded folding groove and one or more side roof panels coupled to the central roof panel, and a door assembly, further comprising: a pair of door panels, each door panel comprising a door side panel connected to a door body via an embedded folding groove, wherein the embedded folding groove has thinner plastic material than the rest of the door panel, and wherein the embedded folding groove enables the door body to rotate in relation to the door side panel, and a plurality of pivotable frame brackets, each metal pivotable frame bracket encasing an edge of the door side panel and the door body near the embedded folding groove.

According to some embodiments, each of the plurality of pivotable frame brackets comprises a pair of rotatable support members affixed to reinforce the door panel. Furthermore, the door side panel and door body are constrained within corresponding U-shaped grooves on the pair of rotatable support members.

According to some embodiments, the side walls of the pair of rotatable support members can have through holes, and corresponding mounting holes can be provided on the corresponding positions of the door side panel and door body. Furthermore, a plurality of fixation components configured to fix the plurality of pivotable frame brackets via the through holes and the corresponding mounting holes.

According to some embodiments, each door panel further comprises a recessed door handle. Furthermore, the fitting edges of the pair of door panels have staggered interlocking structure to engage the two door panels when they are closed.

Compared to conventional designs, the advantages of the present subject matter include: The door body can be connected to the door side panel through a seamless, embedded folding groove that have thinner plastic material than remaining of the panel. The door side panel and the door body are integrally formed by blow molding in one process. Furthermore, pivotable frame bracket can encase the edge of the joint rotating panels to increase the door's strength and durability Other aspects and advantages of the present subject matter will become apparent from the following detailed description taken in conjunction with the accompanying drawings, which illustrate, by way of example, the principles of the present subject matter.

DESCRIPTION OF DRAWINGS

The present subject matter will be further described in detail below with reference to the embodiments of the accompanying drawings.

DETAILED DESCRIPTION

It is to be understood that even though numerous characteristics and advantages of various embodiments of the present subject matter have been set forth in the foregoing description, together with details of the structure and function of various embodiments of the subject matter, this disclosure is illustrative only. In some cases, certain subassemblies are only described in detail with one such embodiment. Nevertheless, it is recognized and intended that such subassemblies may be used in other embodiments of the subject matter. Practitioners skilled in the art will recognize many modifications and variations. Changes may be made in detail, especially matters of structure and management of parts within the principles of the embodiments of the present subject matter to the full extent indicated by the broad general meaning of the terms in which the appended claims are expressed.

Having disclosed exemplary embodiments and the best mode, modifications and variations may be made to the disclosed embodiments while remaining within the scope of the embodiments of the subject matter as defined by the following claims.

Figure 1:
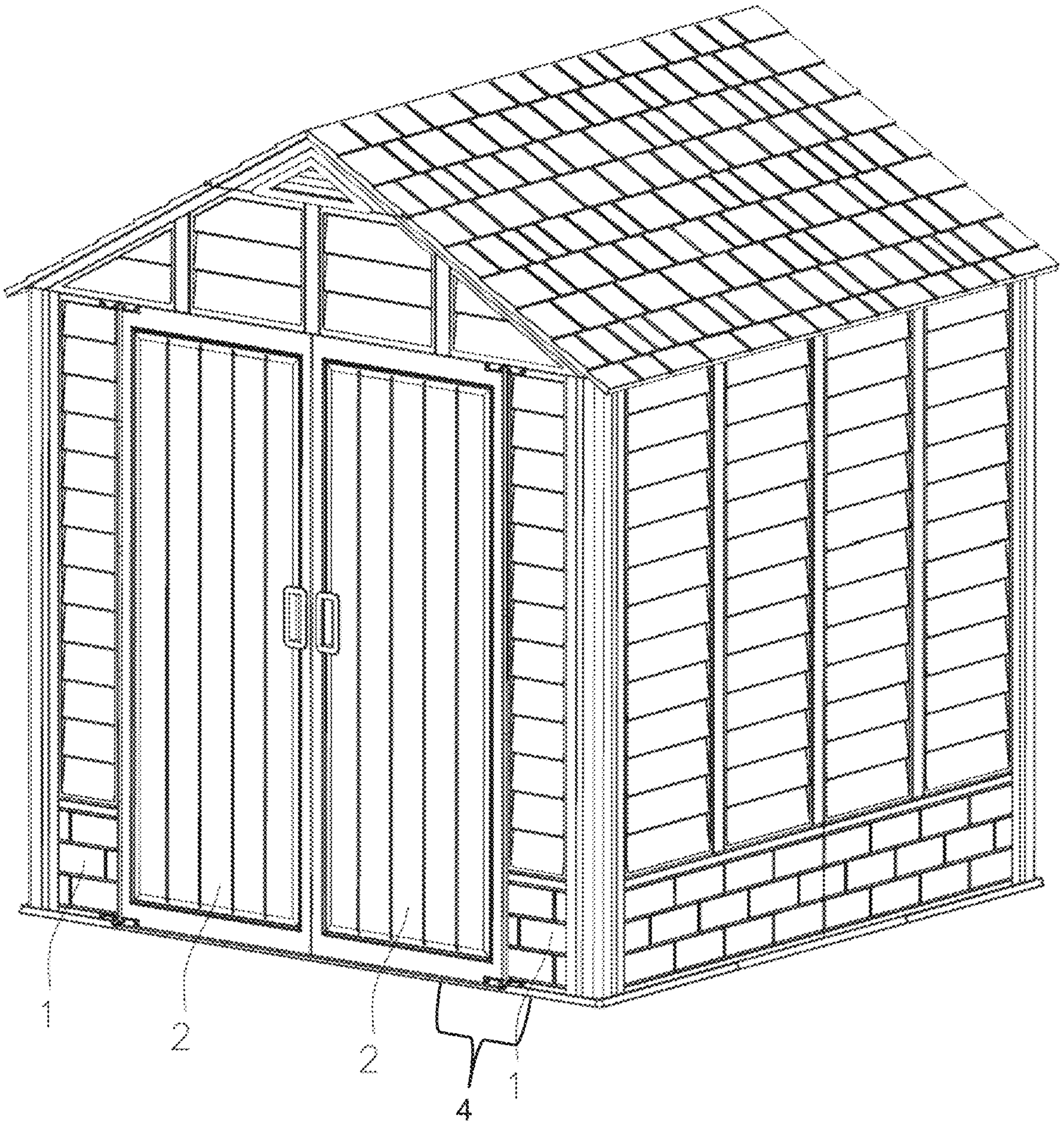
FIG. 1 is a schematic diagram of a prefab modular shed structure with the integrated door assembly, according to one embodiment of the present subject matter.
Figure 2:
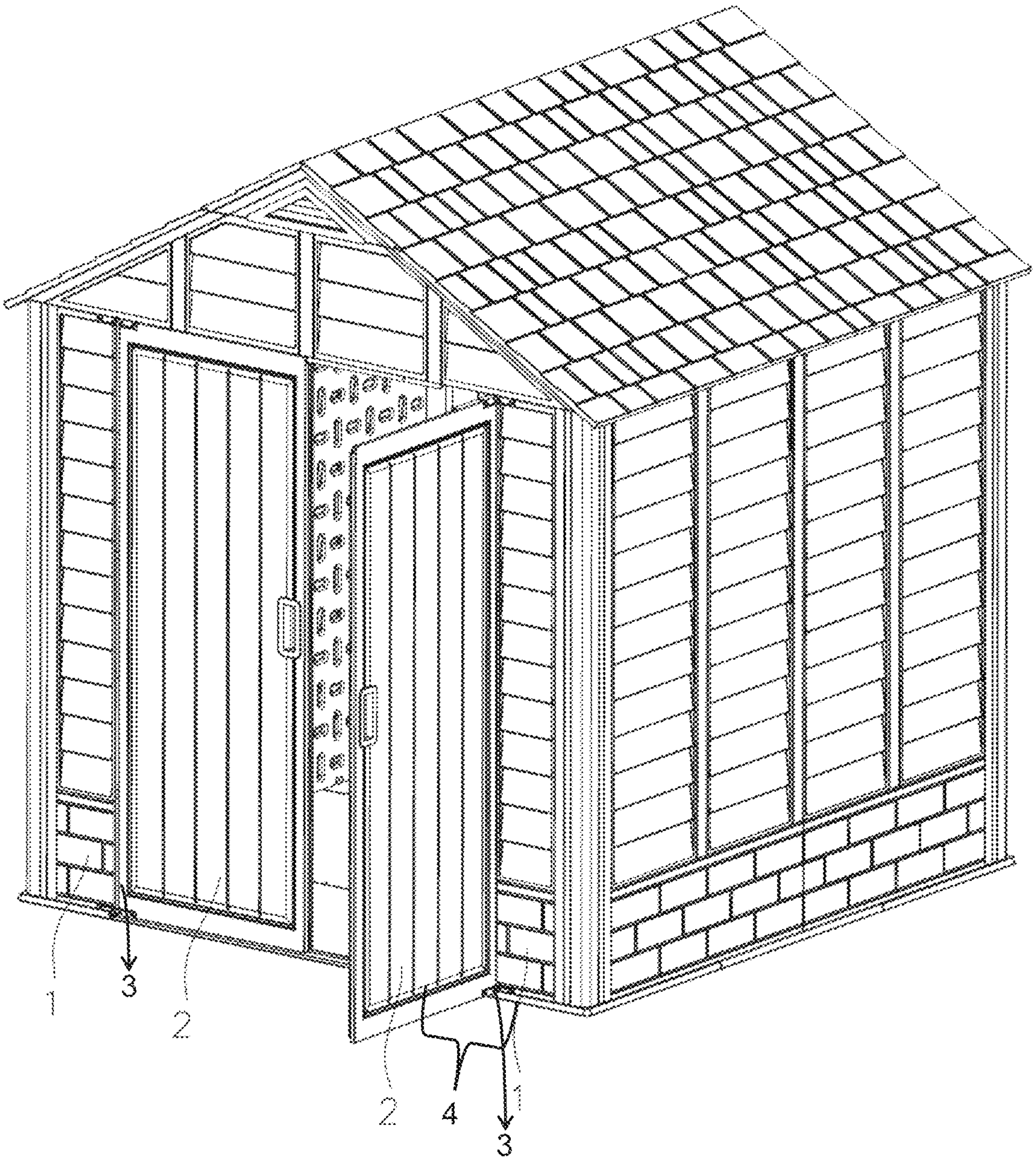
FIG. 2 is another schematic diagram of the shed structure shown in FIG. 1 with the integrated door assembly open.

According to some embodiments, as shown in FIGS. 1 and 2, a prefab modular shed structure can include a floor, a roof, side wall panels, door lintels, and door panels, which can be made of blow-molded panels and assembled on site with a modular overlapping method. The roof can be detachably installed on the roof's beam support frames. The door lintel can be detachably installed on the wall panels and door panels. According to some embodiments, the bottom of the wall panels can be detachably connected to the floor panels.

As shown in FIGS. 1 and 2, the door assembly can comprise two door panels 4. Each door panel 4 can comprise a door side panel 1 and a door body 2 that are integrally formed in one blow-molding process. The door body 2 can be connected to the door side panel 1 through an embedded folding groove 3 that is integrally formed with both the door side panel 1 and the door body 2, allowing the door body 2 to rotate relative to the door side panel 1. The embedded folding groove 3 can have thinner plastic material than remaining of the panel. This design can eliminate the need for conventional hinge structures, which can be time consuming and difficult to install, while creating a seam for allowing rain to seep in. This also enables the door body and side panel to be formed together in one blow-molding process and using a single mold, thus improving the manufacture efficiency.

Figure 3:
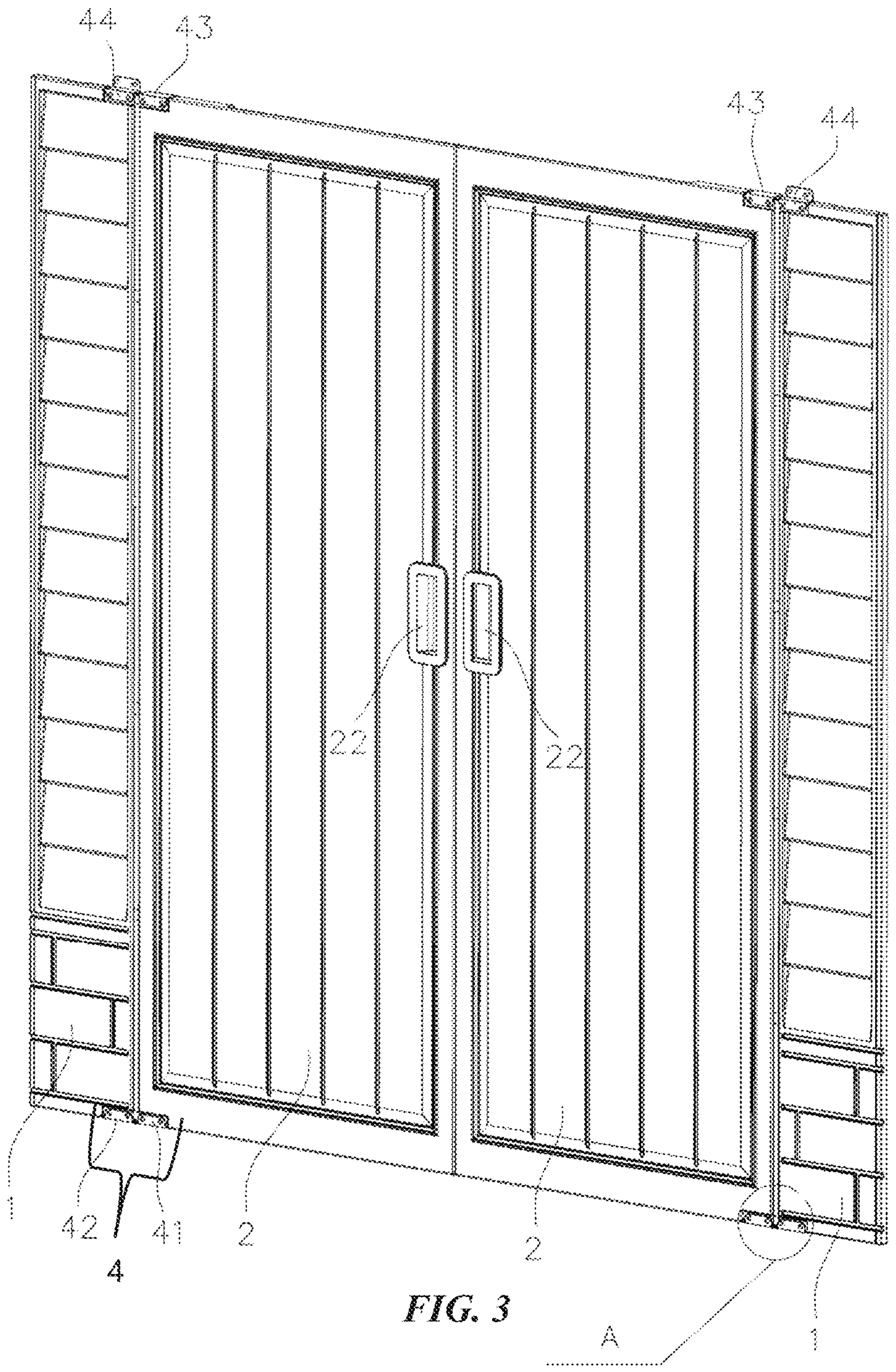
FIG. 3 is a schematic diagram of the door assembly, according to one embodiment of the present subject matter.
Figure 4:
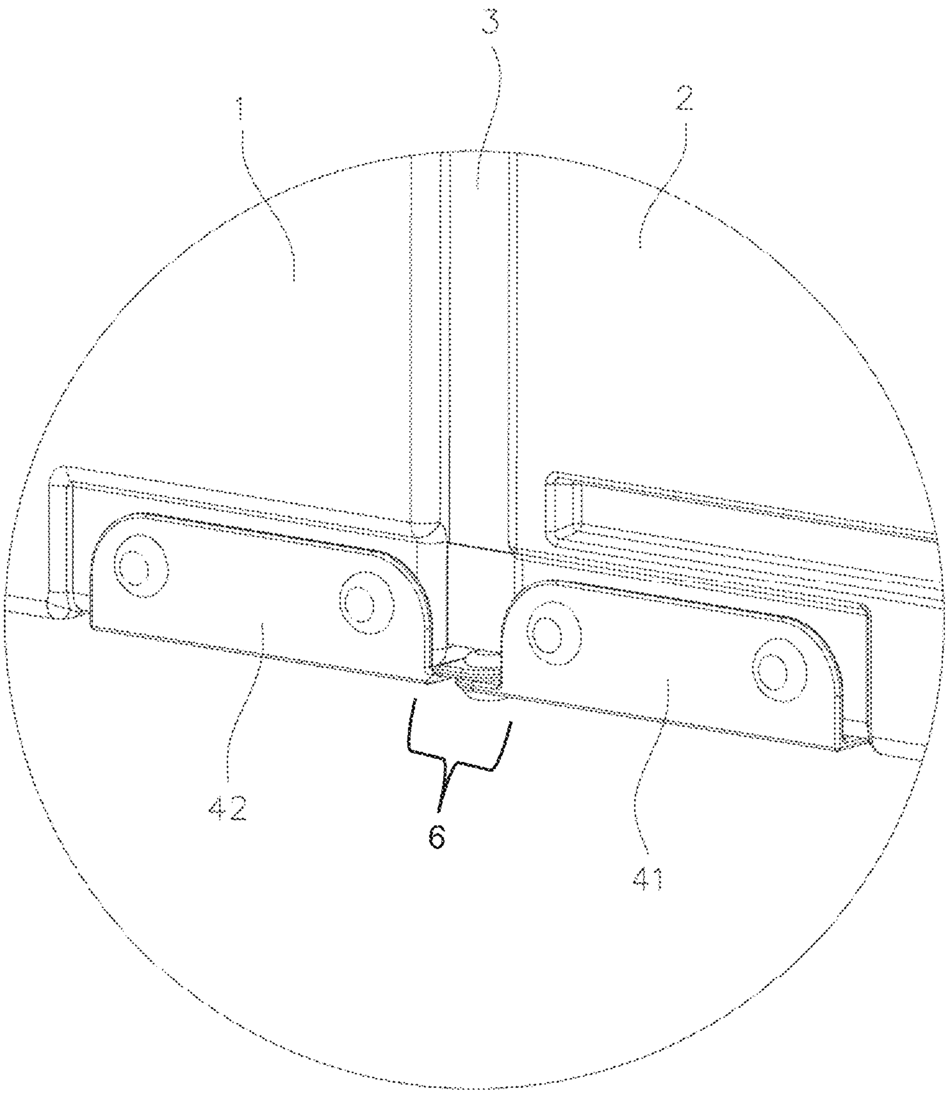
FIG. 4 is a schematic diagram of the door assembly with a pivotable frame bracket, according to one embodiment of the present subject matter.
Figure 5:
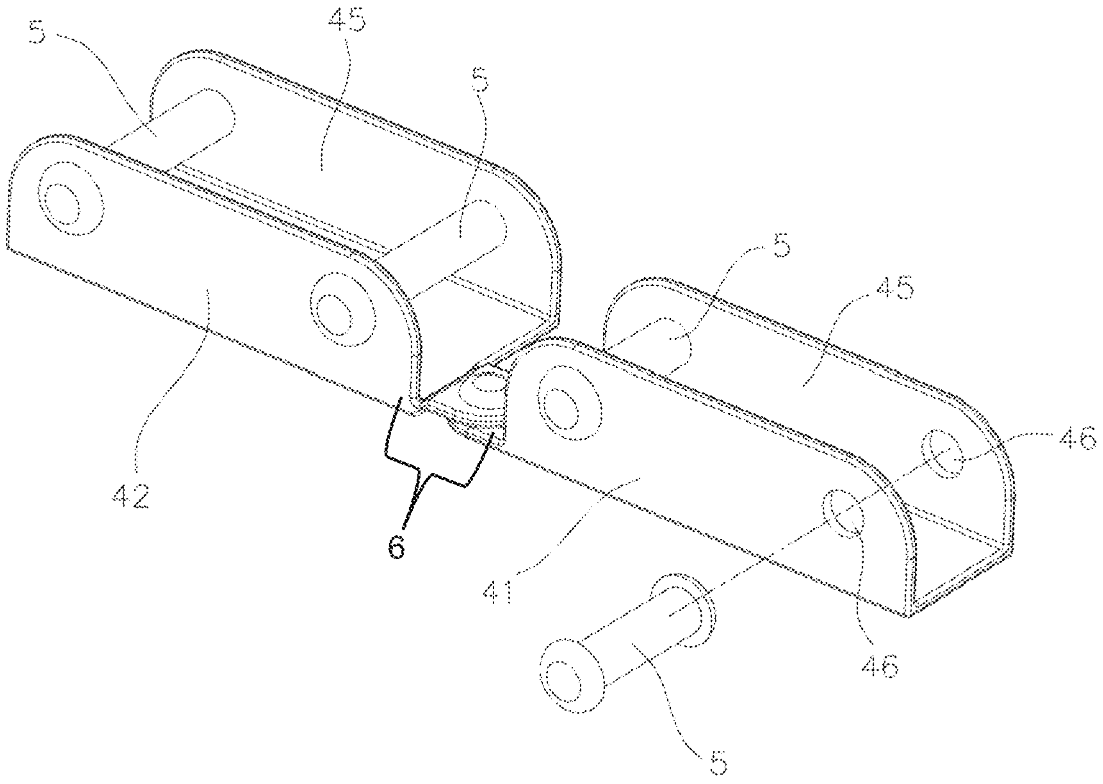
FIG. 5 is a schematic diagram of the pivotable frame bracket, according to one embodiment of the present subject matter.

According to some embodiments, a pivotable frame bracket 6 can encase the edge of the rotating panels to increase the strength and durability of the door. As shown in FIGS. 4 and 5, the pivotable frame bracket 6 can comprise a pair of rotatable support members affixed to the pivotable joint of the door panel to reinforce the door structure. For example, as shown in FIG. 3, the bottom of the door side panel 1 near the door body 2 can be equipped with a first support member 42, whereas the bottom of the door body 2 is equipped with a second support member 41. As shown in FIGS. 4 and 5, the first support member 42 and the second support member 41 can be rotatably connected to each other to form the pivotable frame bracket 6. The embedded folding groove 3 can be positioned above the rotational connection of the first and second support members 41 and 42.

Additionally, the top of the door side panel 2 near the door body 1 can be equipped with a third support member 44, whereas the top of the door body 2 can have a fourth support member 43. The third and fourth support members 43, 44 can be also rotatably connected, with the embedded folding groove 3 placed under their rotational connection. By supporting the door structure with these encasing brackets, it can prevent the door panel 4 from sagging over time and avoid torsion problems due to unsynchronized movement of the door panel. According to some embodiments, each support member can be equipped with a U-shaped fixed groove 45 that wraps around a panel's edge and functions as a frame enforce bracket to improve structural stability.

According to some embodiments, the pivotable frame bracket 6 can be made of metal or another durable material. The bracket 6 can form U-shaped fixed grooves 45. The door side panel 1 and door body 2 can be constrained within the corresponding U-shaped grooves 45. The side walls of the U-shaped fixed groove 45 can have through holes 46, and corresponding mounting holes can be provided on the corresponding positions of the door side panel 1 and door body 2. A fixation component or fastener, such as a pin or screw 5, can pass through these mounting holes and through holes 46 to secure the respective support members to the door side panel 1 and door body 2.

According to some embodiments, as shown in FIG. 3, the door body 2 can feature a recessed door handle 22. The recessed design can ensure a flat and aesthetically pleasing door surface while also reduce packaging space during transportation.

Figure 6:
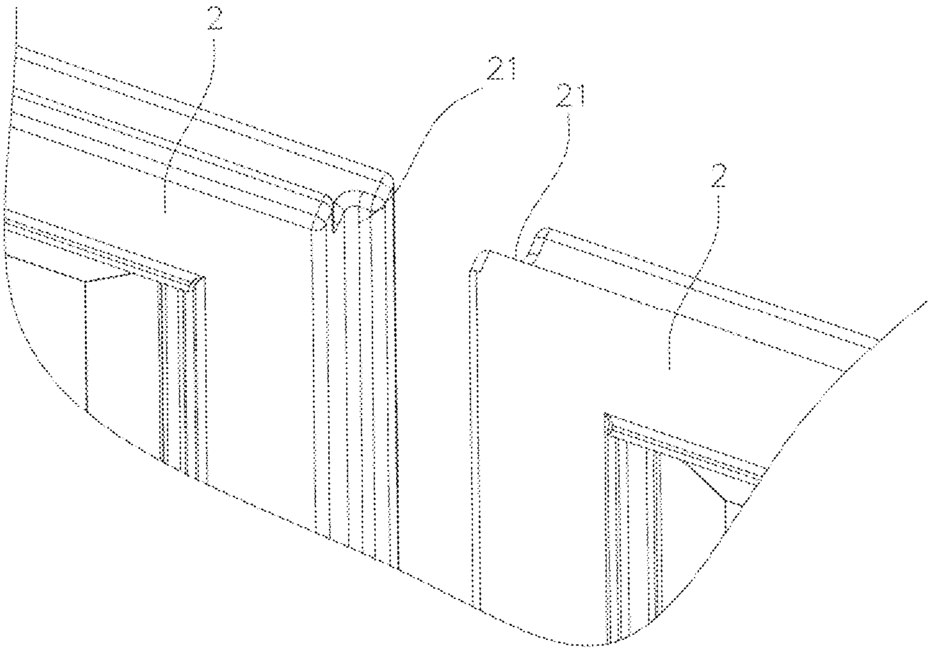
FIG. 6 is a schematic diagram of the door assembly with the staggered interlocking structure, according to one embodiment of the present subject matter.

As shown in FIG. 6, the fitting edges of the two door panels can have staggered interlocking structures 21 to render an optimized closure and to prevent rainwater from seeping into the shed structure.

According to some embodiments, the storage shed structure of the present subject matter can be an indoor shed. Furthermore, some or all features of the present subject matter can be incorporated into other types of molded plastic assembly.

The above are only the preferred embodiments of the present subject matter. It should be pointed out that for those of ordinary skill in the art, without departing from the principle of the present subject matter, various modifications or improvements can be made to the present subject matter, such as in other applications. For example, the disclosed features can be incorporated into other molded plastic furniture assemblies, or these features, when applicable, can be incorporated into non-molded plastic furniture assembly, and these are all considered to be within the protection scope of the present subject matter.

It is to be understood that even though numerous characteristics and advantages of various embodiments of the present subject matter have been set forth in the foregoing description, together with details of the structure and function of various embodiments of the subject matter, this disclosure is illustrative only. In some cases, certain subassemblies are only described in detail with one such embodiment. Nevertheless, it is recognized and intended that such subassemblies may be used in other embodiments of the subject matter. Practitioners skilled in the art will recognize many modifications and variations. Changes may be made in detail, especially matters of structure and management of parts within the principles of the embodiments of the present subject matter to the full extent indicated by the broad general meaning of the terms in which the appended claims are expressed.

Having disclosed exemplary embodiments and the best mode, modifications and variations may be made to the disclosed embodiments while remaining within the scope of the embodiments of the subject matter as defined by the following claims.

What is claimed is:

1. A door assembly of a blow-molded modular shed, comprising:
   - a pair of door panels, each door panel comprising a door side panel connected to a door body via an embedded folding groove defined by a living hinge extending an entire length thereof dividing each panel into a first leaf and a second leaf, wherein the embedded folding groove enables the door body to rotate in relation to the door side panel; and
   - a plurality of pivotable frame brackets, each pivotable frame bracket encasing an edge of the door side panel and the door body proximate the embedded folding groove, each pivotable frame bracket comprising a pair of rotatable support members having sidewalls affixed to and reinforcing the door panels.

2. The door assembly of claim 1, wherein each door panel further comprises a recessed door handle.

3. The door assembly of claim 1, wherein fitting edges of the pair of door panels have staggered interlocking structure to engage the two door panels in a closed position.

4. The door assembly of claim 1, wherein the door side panel and door body are constrained within corresponding U-shaped grooves on the pair of rotatable support members.

5. The door assembly of claim 1, wherein the side walls of the pair of rotatable support members have through holes, and corresponding mounting holes provided on corresponding positions of the door side panel and door body.

6. The door assembly of claim 5, further comprising a plurality of fixation components configured to fix the plurality of pivotable frame brackets via the through holes and the corresponding mounting holes.

7. A door assembly of a blow-molded modular shed, comprising:
   - a pair of foldable door panels, each door panel comprising a door side panel connected to a door body via an embedded folding groove, wherein the embedded folding groove is defined by a living hinge extending an entire length thereof dividing each foldable panel into a first leaf and a second leaf, and wherein the embedded folding groove enables the door body to rotate in relation to the door side panel; and
   - a plurality of metal pivotable frame brackets, each metal pivotable frame bracket encasing an edge of the door side panel and the door body proximate the embedded folding groove, each metal pivotable frame bracket comprising a pair of rotatable support members having sidewalls affixed to and reinforcing the door panels.

8. The door assembly of claim 7, wherein each door panel further comprises a recessed door handle.

9. The door assembly of claim 7, wherein fitting edges of the pair of door panels have staggered interlocking structure to engage the two door panels in a closed position.

10. The door assembly of claim 7, wherein the door side panel and door body are constrained within corresponding U-shaped grooves on the pair of rotatable support members.

11. The door assembly of claim 10, wherein the side walls of the pair of rotatable support members have through holes, and corresponding mounting holes provided on corresponding positions of the door side panel and door body.

12. The door assembly of claim 11, further comprising a plurality of fixation components configured to fix the plurality of metal pivotable frame brackets via the through holes and the corresponding mounting holes.

13. A modular shed structure made of molded plastic panels, comprising:

a floor comprising a plurality of floor panels;

a plurality of wall panels coupled with the plurality of floor panels;

a door assembly comprising:

a pair of foldable door panels, each door panel comprising a door side panel connected to a door body via a first embedded folding groove, wherein the first embedded folding groove is defined by a first living hinge extending an entire length thereof dividing each door panel into a first leaf and a second leaf, and wherein the first embedded folding groove enables the door body to rotate in relation to the door side panel; and a plurality of metal pivotable frame brackets, each metal pivotable frame bracket encasing an edge of the door side panel and the door body proximate the first embedded folding groove, each metal pivotable frame bracket comprising a pair of rotatable support members having sidewalls affixed to and reinforcing the door panels; and a roof that comprises a central roof panel that is foldable via a second embedded folding groove defined by a second living hinge and one or more side roof panels coupled thereto.

14. The modular shed structure of claim 13, wherein the door side panel and door body are constrained within corresponding U-shaped grooves on the pair of rotatable support members.

15. The modular shed structure of claim 13, wherein the side walls of the pair of rotatable support members have through holes, and corresponding mounting holes provided on corresponding positions of the door side panel and door body.

16. The modular shed structure of claim 15, further comprising a plurality of fixation components configured to fix the plurality of metal pivotable frame brackets via the through holes and the corresponding mounting holes.

* * * * *